United States Patent Office 3,654,177
Patented Apr. 4, 1972

3,654,177
EMULSIFIER COMPOSITION
John T. Foley, Readington Township, N.J., assignor to Witco Chemical Corporation, New York, N.Y.
No Drawing. Filed Jan. 12, 1970, Ser. No. 2,357
Int. Cl. B01f 17/16, 17/22, 17/32
U.S. Cl. 252—356  8 Claims

ABSTRACT OF THE DISCLOSURE

Emulsifier compositions comprising admixtures of (a) an imidazoline or oxazoline salt of a long chain fatty acid and (b) a salt of a long chain aliphatic amido amine and a long chain aliphatic carboxylic acid, said emulsifier compositions being particularly effective for preparing water-in-oil emulsions which exhibit excellent heat stability and metal coating properties for corrosion inhibition.

---

The present invention relates to novel emulsifier compositions and also to the production of stable water-in-oil emulsions containing said emulsifier compositions.

It is often desired to prepare emulsions of water and oil. Emulsions of water in various oleaginous media wherein the oleaginous material is the continuous phase and water or aqueous material is the dispersed phase have been employed for numerous applications as, for instance, oil well drilling muds, cutting oils, hydraulic fluids, lubricants, cosmetics, agricultural emulsions, etc., where the lubricating, corrosion protection or cosmetic characteristics of the oleaginous material is desired, and the water or aqueous material serves to bring about fire resistance or serves other functions, as the case may be. Such emulsions are commonly prepared prior to use so as to insure proper formulation, or they may be formed in situ where, for instance, environmental moisture is emulsified thereby reducing corrosion problems or preventing the water from being absorbed by the surroundings.

For oil well packer fluids, water-in-oil emulsions are especially desirable from an economic standpoint since the conventionally used oleaginous materials are composed totally of hydrocarbons. Furthermore, an emulsifier exhibiting metal coating characteristics protects the well casing against corrosion and thus offers significant additional advantages.

In accordance with the present invention there have been discovered novel emulsifier compositions comprising mixtures of (a) an imidazoline salt (or oxazoline salt as pointed out below) of a $C_8$ to $C_{22}$ long chain carboxylic acid, particularly a monocarboxylic or fatty acid, said imidazoline having the formula

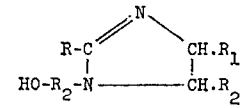

in which R is an aliphatic radical containing from 8 to 22 carbon atoms; $R_1$ is of the group consisting of hydrogen and lower alkyl; and $R_2$ is of the group consisting of an alkylene hydrocarbon group, a lower alkyl substituted alkylene hydrocarbon group, and a radical of the structure $CHR_1 \cdot CHR_1(NH \cdot CHR_1 \cdot CHR_1)_x$ where $x$ is an integer, preferably from 1 to 5, and (b) a salt of a long chain aliphatic amido amine and a long chain aliphatic carboxylic acid, said salt having the general formula

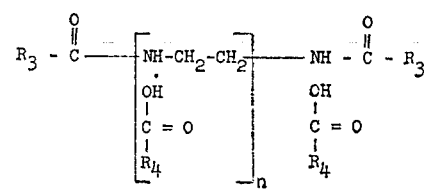

wherein $n$ is an integer from 1 to 4 and $R_3$ and $R_4$ represent $C_8$ to $C_{100}$ alkyl or alkenyl radicals. The aforesaid emulsifier compositions are highly effective for preparing water-in-oil emulsions which are stable at elevated temperatures and in the presence of electrolytes.

The relative amounts of said (a) and (b) ingredients in the aforesaid emulsifier compositions is quite variable; said (a) ingredient may be present in an amount of from about 15 to 85% by weight of said mixture and the (b) ingredient may be present in an amount of from about 85 to 15% by weight of said mixture, and preferably there will be present 20 to 30% by weight of said (a) ingredient and 80 to 70% by weight of said (b) ingredient.

The imidazolines suitable for preparing the imidazoline-fatty acid salts which form the aforesaid (a) component of the novel emulsifier compositions are, per se, well known and are shown, for instance, in U.S. Pats. Nos. 2,267,965; 2,528,378 and 2,574,537. As described in said Pat. No. 2,267,965, they can be represented by the formula

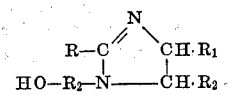

in which R is an aliphatic radical containing from 8 to 22 carbon atoms; $R_1$ is of the group consisting of hydrogen and lower alkyl; and $R_2$ is of the group consisting of an alkylene hydrocarbon group, a lower alkyl substituted alkylene hydrocarbon group, and a radical of the structure $CHR_1 \cdot CHR_1(NH \cdot CHR_1 \cdot CHR_1)_x$ where $x$ is an integer, preferably 1 to 5.

They are commonly prepared by condensing, under conditions of heating and stirring, a long chain aliphatic monocarboxylic or fatty acid (or a source thereof such as amides or esters of said acids) with a hydroxyalkyl alkylene polyamine, such as aminoethylethanolamine. The mol ratio of the acid to the polyamine is variable but generally falls within the range of 1 mol of the acid to 1 to about 2 mols of the polyamine, and the temperature at which the condensation reaction is carried out is generally in excess of 100° C., usually in the range of about 120° C. to about 250 or 300° C., and the reaction time is several hours, usually within the range of about 4 to 12 hours, depending upon the particular reactants employed and the particular condensation temperature employed; or, where the reaction is carried out under less than atmospheric pressure, the reaction temperature may be somewhat reduced. Usually, the condensation temperature or temperature of heating and the duration of the heating are so correlated as to cause splitting out of water in excess of 1.5 mols for each mol of free acid and in excess of 0.5 mol for each mol of combined acid involved.

The oxazolines are formed from higher fatty acid amides of such hydroxyl amines as N-B-hydroxyethyl amine and 2-amino-1,3-propanediol by ring closure, as shown, for instance, in U.S. Pat. No. 2,416,552.

The long chain aliphatic carboxylic acids, notably the monocarboxylic or fatty acids used in producing the imidazolines, include saturated as well as ethylenically unsaturated naturally occurring and synthetic acids containing especially from 8 to 22, particularly 12 to 18, carbon atoms and encompass such acids as lauric acid, myristic acid, palmitic acid, oleic acid, stearic acid and commercial mixtures of various of such acids as are derived from animal, fish and vegetable oils and fats such as coconut oil, cottonseed oil, corn oil, tallow, babassu oil, palm kernel nut oil, soya oil, linseed oil, castor oil, olive oil, and also such monocarboxylic acid mixtures as are present in tall oil or refined tall oil and the like. Other carboxylic acids which can be utilized are polymeric fatty acids such as the dimeric and trimeric fatty acids derived from fatty acids such as the dimeric and trimeric fatty acids derived from fatty acids from 12 to 22 carbon atoms, particularly from $C_{16}$–$C_{18}$ liquid unsaturated fatty acids. Such polymeric acids are sold commercially under the trade designations EMPOL 1010, 1014, 1015, 1016 and 1022; and EMERY isostearic acids, Nos. 871 and 3185-D (Emery Industries, Inc.). Still other monocarboxylic acids which can be utilized are saturated tertiary monocarboxylic acids such as those sold under the trade designation "Versatic" Acid and comprising a mixture of $C_9$, $C_{10}$ and $C_{11}$ acids. In place of free acids, the amides or esters thereof can be employed, including the glyceride esters such as the foregoing oils and fats, as well as the monohydric alcohol esters such as the methyl esters of the foregoing acids.

The hydroxyalkyl polyamines, notably the hydroxy lower alkyl lower alkylene polyamines, which are used to produce the imidazolines, can likewise be selected from large numbers of known examples thereof, including aminoethylethanolamine or beta-hydroxyethyl ethylenediamine, hydroxyethyl diethylenetriamine, hydroxyethyl triethylenetetraamine and other hydroxyalkyl alkylene polyamines of the 1,2 series, that is, wherein at least one amine group and one imino group are attached to adjacent carbon atoms.

The particularly preferred imidazolines for use in accordance with the present invention can be represented by the formula

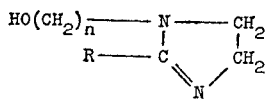

where R is $C_8$ to $C_{22}$, advantageously $C_{12}$ to $C_{18}$, alkyl or alkenyl, and $n$ is an integer from 1 to 5, advantagously 2. Of special utility are said imidazolines which are prepared by condensing oleic acid or tall oil fatty acids with aminoethylethanolamne.

The imidazoline salt is produced by reacting the imidazoline with approximately equimolar quantities of saturated or unsaturated fatty acid containing from 8 to 22, and preferably 12 to 18, carbon atoms. Generally both reactants are liquids, except for fatty acids such as stearic acid which are solid at room temperature. The imidazoline and the fatty acid are mixed and heated to about 70° C. whereby to form the aforesaid (a) component of the novel emulsifier compositions of the present invention, bonding taking place between the imidazoline nitrogen and the carboxylic hydrogen of the fatty acid.

The aforesaid (b) ingredients of the emulsifier compositions of the present invention are long chain aliphatic amido amine salts of long chain aliphatic carboxylic acids and are represented by the general formula

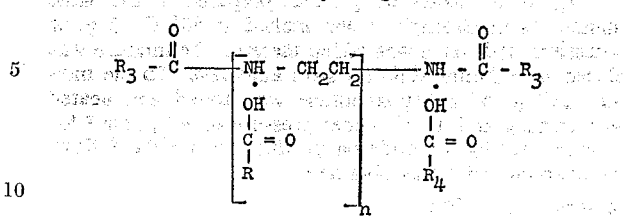

wherein $n$ is an integer from 1 to 4 and $R_3$ and $R_4$ represent alkyl or alkenyl radicals containing from 8 to 100 carbon atoms. This long chain amido amine salt may be prepared, for instance, by first reacting a polyamine such as ethylene diamine, diethylene triamine, triethylene tetraamine and, preferably, tetraethylene pentamine with either a $C_8$ to $C_{22}$ aliphatic monocarboxylic acid or an oxidized hydrocarbon wax so as to form an amide condensation product, said waxes being those oxidized hydrocarbon waxes derived from the paraffin waxes, microcrystalline waxes and synthetic Fischer-Tropsch waxes, said oxidized waxes generally containing from 18 to 100 carbon atoms per molecule, and having saponification values of between about 15 and 100, acid values of from about 5 to 60, and molecular weight of between about 280 and 1600. Most suitable in preparing the emulsifier compositions of the present invention are fatty acids containing from 12 to 18 carbon atoms, especially the tall oil fatty acids, and oxidized waxes derived from microcrystalline and Fischer-Tropsch waxes and containing from about 35 to 80 carbon atoms per molecule.

In the preparation of the (b) ingredient there is employed an approximately 2 to 1 molar ratio of aliphatic monocarboxylic acid to amine; or, when an oxidized wax is employed, the quantities are based on the ratio of 1 carboxyl group for each primary amino group, since an oxidized wax may have more than one —COOH group per molecule, as is determined from the saponification value. In this step substantially only primary amino groups will react. This product may be formed by heating together, in vacuo or in an inert atmosphere, the polyamine and fatty acid or oxidized wax to a temperature of from about 100° C. to 175° C., and preferably about 160° C. After the amide is formed the reaction batch is cooled down to about 100° C. and additional fatty acid or oxidized wax, as the case may be, is added, the quantity being based on one —COOH group for each available secondary amino group, and, after completion of the reaction and cooling, the aforesaid (b) component is recovered as a waxy solid.

Preferably the (b) ingredient is prepared by forming the amide condensation product of tetraethylene pentamine and an oxidized hydrocarbon wax containing from about 35 to 80 carbon atoms, and thereafter adding a $C_{12}$ to $C_{18}$ fatty acid, especially oleic acid, to complete the formation of the long chain amido amine salt.

The (a) and (b) ingredients may be combined by adding the waxy, solidified (b) ingredient as such to the (a) ingredient, a liquid, or by melting the (b) ingredient prior to admixing it with the imidazoline salt or the oxazoline salt.

Water-in-oil emulsions prepared in accordance with the present invention, utilizing the above described emulsifier compositions, generally comprise at least about 1% by weight of said emulsifier composition, at least about 5% by weight of oleaginous material as the continuous phase, and the balance water or aqueous electrolyte solution as the dispersed phase. Preferably there will be employed from about 5 to 10% by weight emulsifier composition. For most applications it is particularly desirable that the emulsions contain from about 25 to 75% by weight of water or aqueous electrolyte as the dispersed phase and from about 75 to 25% by weight of oleaginous material as the continuous phase, said percentages being based on the combined weight of continuous and dispersed phases.

The water-in-oil emulsions of the present invention have the advantages of being capable of being prepared with a wide range of water or aqueous electrolyte solutions, and, in addition, of being stable for extended periods of time at elevated temperatures, and exhibiting little or no tendency to invert into oil-in-water emulsions. The aqueous dispersed phase may contain as much as 30% by weight of electrolytes such as inorganic salts of the alkali metals and alkaline earth metals. It is also important to note that the compositions of the present invention form a corrosion-resistant protective coating upon contiguous metal surfaces, said coating being primarily the novel emulsifier composition itself. This property makes the novel compositions described herein particularly useful as oil well packer fluids for metal well casings.

Oleaginous materials suitable for use in the emulsions of the present invention can be selected from wide groups of animal, vegetable or mineral characters such as animal and vegetable oils and fats: hydrocarbons of paraffinic base, naphthene base and mixed paraffin-naphthene base petroleum oils having SUS viscosities at 100° F. ranging to 1500; aromatic and aliphatic solvents as, for example, chlorinated hydrocarbon solvents, toluene, xylenes, benzene, naphthalene and the like, which are generally water-insoluble; and synthetic lubricating oil of the ester or ether types. Particularly satisfactory are mineral oils or mineral-based oils.

When preparing the water-in-oil emulsions of the present invention, the two-component emulsifier should first be dispersed into the oleaginous phase and preferably by heating the oil phase as the emulsifier is added. The aqueous portion is then added with agitation whereby to form the stable water-in-oil emulsion. Other methods of addition of the components can be employed but these commonly require extreme conditions, e.g. temperature, high-speed blenders or mixers, in order to achieve fully satisfactory emulsions.

Various supplemental materials can be incorporated into the emulsions of the present invention provided, of course, that the material added is compatible with the emulsions and, where extreme high temperature stability is a desideratum, that it does not destroy or adversely affect its high temperature properties. Illustratively, minor amounts, e.g., less than about 5% or 10% by weight of the emulsions, of surfactants such as the following can be added: alkyl aryl sulfonates such as $C_9$–$C_{15}$ alkylbenzene sulfonates; ethoxylated fatty alcohols; sulfated fatty alcohols; sulfonated unsaturated long chain fatty acids; polypropylene glycol oleates; phosphated mono- and diglycerides and mono- and diphosphate esters of aliphatic and aromatic hydroxy-containing compounds and alkylene oxide adducts of such hydroxy-containing compounds.

The following examples are illustrative of the practice of the present invention but they are not to be considered as limitative of its scope. All percentages and all parts reported are by weight.

EXAMPLE I

An emulsifier is prepared composed of 25% of (a) the salt of an imidazoline of the formula

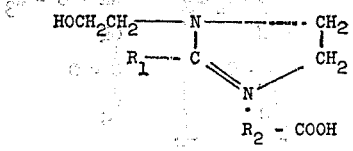

where $R_1$ is a $C_{17}$ alkenyl radical and $R_2$ is the aliphatic portion of a mixture of tall oil fatty acids (approximately 50% oleic acid, 48% linoleic acid and 2% palmitic acid) and 75% of (b) the oleic acid salt of the amido amine formed by condensing an oxidized microcrystalline wax (Sapon. Value=70; acid number=30; M.P.=85° C.) with tetraethylene pentamine in an oxidized wax to amine weight ratio of about 3.8 to 1.

Utilizing the emulsifier described above, an emulsion was prepared by adding 6 parts emulsifier to 25 parts kerosene, warming to about 45° C. and adding with agitation 69 parts water. The emulsion was stable over a 2-hour period at 450° F. Essentially identical results were obtained when saturated sodium chloride solutions were substituted for water.

EXAMPLE II

An emulsifier is prepared composed of 30% of (a) the salt of an imidazoline of the formula

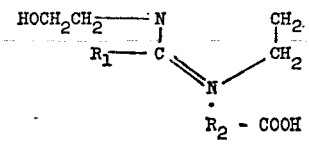

where $R_1$ and $R_2$ are the alkenyl radical of oleic acid, and 70% of (b) the oleic acid salt of the amido amine formed by condensing stearic acid with diethylene triamine in a weight ratio of about 2.8 of the stearic acid to 1 of the diethylene triamine.

EXAMPLE III

An emulsifier is prepared composed of 25% of (a) the salt of an imidazoline of the formula

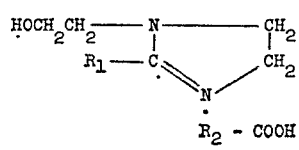

wherein $R_1$ is a $C_{17}$ alkenyl radical and $R_2$ is the aliphatic portion of a mixture of tall oil fatty acids (approximately 50% oleic acid, 48% linoleic acid and 2% palmitic acid) and 75% of (e) the oleic acid salt of the amido amine formed by condensing coconut oil mixed fatty acids with tetraethylene pentamine in a weight ratio of about 3 of the mixed coconut oil fatty acids to 1 of the tetraethylene pentamine.

EXAMPLE IV

An emulsifier is prepared composed of 25% of (a) the oleic acid salt of an oxazoline prepared by condensing 2-amino-1,3-propanediol with oleic acid in the manner described in U.S. Pat. No. 2,416,552, and 75% of (b) the oleic acid salt of the amido amine formed by condensing an oxidized microcrystalline wax (Sapon. Value=70; acid number=30; M.P.=85° C.) with tetraethylene pentamine in an oxidized wax to amine weight ratio of about 3.8 to 1.

EXAMPLE V

Employing the emulsifier composition described in Example I, the following water-in-oil emulsions are illustrative of the practice of the present invention:

(A)

Mineral oil (100 SUS at 100° F.)—175 cc.
Fresh water—175 cc.
Emulsifier—9 g.

(B)

Mineral oil (100 SUS at 100° F.)—175 cc.
Brine water (20% NaCl, 10% $CaCl_2$)—175 cc.
Emulsifier—15 g.

(C)

Mineral oil (100 SUS at 100° F.)—175 cc.
Fresh water—175 cc.
Emulsifier—10 g.

(D)

Mineral oil (250 SUS at 100° F.)—175 cc.
Brine water—175 cc.
Emulsifier—10 g.

(E)

Diesel fuel—175 cc.
Fresh water—175 cc.
Emulsifier—30 g.

(F)

Toluene—175 cc.
Fresh water—175 cc.
Emulsifier—20 g.

(G)

Toluene—175 cc.
Brine water—175 cc.
Emulsifier—25 g.

The emulsions are prepared in Example V and in the following Examples VI, VII and VIII by adding the emulsifier to the oleaginous material and then adding the aqueous phase with agitation.

EXAMPLE VI

Employing the emulsifier composition described in Example II, the following water-in-oil emulsions are illustrative of the practice of the present invention:

(A)

Mineral oil (100 SUS at 100° F.)—175 cc.
Fresh water—175 cc.
Emulsifier—9 g.

(B)

Mineral oil (100 SUS at 100° F.)—175 cc.
Brine water (20% NaCl, 10% CaCl$_2$)—175 cc.
Emulsifier—15 g.

(C)

Mineral oil (250 SUS at 100° F.)—175 cc.
Fresh water—175 cc.
Emulsifier—10 g.

(D)

Mineral oil (250 SUS at 100° F.)—175 cc.
Brine water—175 cc.
Emulsifier—10 g.

(E)

Toluene—175 cc.
Fresh water—175 cc.
Emulsifier—20 g.

(F)

Toluene—175 cc.
Brine water—175 cc.
Emulsifier—25 g.

EXAMPLE VII

Employing the emulsifier composition described in Example III, the following water-in-oil emulsions are illustrative of the practice of the present invention:

(A)

Mineral oil (100 SUS at 100° F.)—175 cc.
Fresh water—175 cc.
Emulsifier—9 g.

(B)

Mineral oil (250 SUS at 100° F.)—175 cc.
Fresh water—175 cc.
Emulsifier—10 g.

(C)

Mineral oil (250 SUS at 100° F.)—175 cc.
Brine water—175 cc.
Emulsifier—10 g.

(D)

Toluene—175 cc.
Fresh water—175 cc.
Emulsifier—20 g.

(E)

Toluene—175 cc.
Brine water—175 cc.
Emulsifier—25 g.

EXAMPLE VIII

Employing the emulsifier composition described in Example IV, the following water-in-oil emulsions are illustrative of the practice of the present invention:

(A)

Mineral oil (100 SUS at 100° F.)—175 cc.
Fresh water—175 cc.
Emulsifier—9 g.

(B)

Mineral oil (100 SUS at 100° F.)—175 cc.
Brine water (20% NaCl, 10% CaCl$_2$)—175 cc.
Emulsifier—15 g.

(C)

Mineral oil (250 SUS at 100° F.)—175 cc.
Fresh water—175 cc.
Emulsifier—10 g.

(D)

Mineral oil (250 SUS at 100° F.)—175 cc.
Brine water—175 cc.
Emulsifier—10 g.

(E)

Diesel fuel—175 cc.
Fresh water—175 cc.
Emulsifier—30 g.

(F)

Toluene—175 cc.
Fresh water—175 cc.
Emulsifier—20 g.

(G)

Toluene—175 cc.
Brine water—175 cc.
Emulsifier—25 g.

What is claimed is:

1. An emulsifier composition consisting essentially of an admixture of (a) an imidazoline salt of a long chain carboxylic acid, said imidazoline having the formula

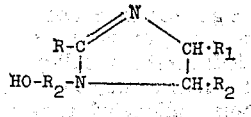

in which R is a long chain aliphatic radical; $R_1$ is of the group consisting of hydrogen and lower alkyl; and $R_2$ is of the group consisting of an alkylene hydrocarbon group, a lower alkyl substituted alkylene hydrocarbon group, and a radical of the structure

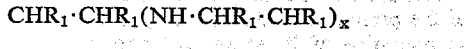

where $x$ is an integer from 1 to 5; and (b) a salt of a long chain aliphatic amido amine and a long chain aliphatic carboxylic acid, said salt having the general formula

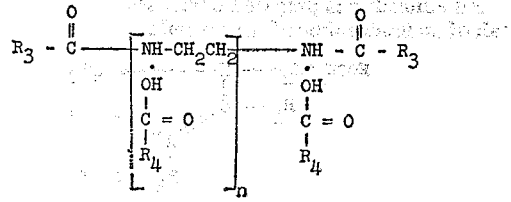

wherein $n$ is an integer from 1 to 4 and $R_3$ and $R_4$ represent a radical of the group consisting of alkyl and alkenyl radicals containing from 8 to 100 carbon atoms, said (a) ingredient of the mixture being present in an amount of from about 15 to 85% by weight and said (b) ingredient being present in an amount of from about 85 to 15% by weight of said mixture.

2. An emulsifier composition according to claim 1 wherein the imidazoline of said (a) ingredient corresponds to the formula

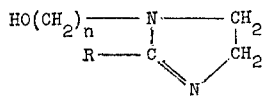

wherein R represents an alkyl or alkenyl radical containing from 8 to 22 carbon atoms and $n$ is an integer from 1 to 5.

3. An emulsifier composition according to claim 2 wherein R contains from 12 to 18 carbon atoms and $n$ is 2.

4. An emulsifier composition according to claim 3 wherein in said (b) ingredient $R_3$ represents alkyl or alkenyl having from 35 to 80 carbon atoms and $R_4$ represents alkyl and alkenyl having from 12 to 18 carbon atoms.

5. An emulsifier composition according to claim 4 wherein in said (b) ingredient $n$ is 4.

6. An emulsifier composition according to claim 3 wherein in said (b) ingredient each of $R_3$ and $R_4$ represents alkyl or alkenyl radicals having from 12 to 18 carbon atoms.

7. An emulsifier composition consisting essentially of an admixture of (a) a long chain aliphatic carboxylic acid salt of an oxazoline of a long chain aliphatic carboxylic acid, said oxazoline being formed from a higher fatty acid amide of a hydroxy lower alkyl amine; and (b) a salt of a long chain aliphatic amido amine and a long chain aliphatic carboxylic acid, said salt having the general formula

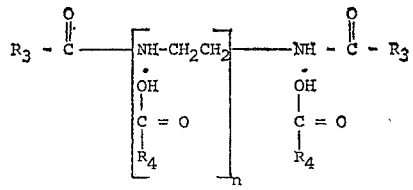

wherein $n$ is an integer from 1 to 4 and $R_3$ and $R_4$ represent a radical of the group consisting of alkyl and alkenyl radicals containing from 8 to 100 carbon atoms, said (a) ingredient of the mixture being present in an amount of from about 15 to 85% by weight and said (b) ingredient being present in an amount of from about 85 to 15% by weight of said mixture.

8. An emulsifier composition according to claim 7 wherein the long chain aliphatic carboxylic acid of said salt and of said oxazoline of ingredient (a) is that of a fatty acid containing from 12 to 18 carbon atoms.

References Cited

UNITED STATES PATENTS

| | | | |
|---|---|---|---|
| 2,267,965 | 12/1941 | Wilson | 260—309.6 |
| 2,416,552 | 2/1947 | Valko | 260—307 |
| 2,636,038 | 4/1953 | Brandner | 252—357 X |
| 2,974,106 | 3/1961 | Fronmuller et al. | 252—357 X |
| 3,097,174 | 7/1963 | Mertens | 252—311.5 |

RICHARD D. LOVERING, Primary Examiner

U.S. Cl. X.R.

106—14; 252—8.55 R, 309, 354